United States Patent
Yamauchi

(10) Patent No.: US 6,304,930 B1
(45) Date of Patent: Oct. 16, 2001

(54) SIGNAL TRANSMISSION SYSTEM HAVING MULTIPLE TRANSMISSION MODES

(75) Inventor: Hiroyuki Yamauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/232,856

(22) Filed: Jan. 19, 1999

(30) Foreign Application Priority Data

Jan. 20, 1998 (JP) ................................................ 10-008713

(51) Int. Cl.[7] ............................. G06F 13/42; G06F 3/00; G06F 13/14
(52) U.S. Cl. ............................. 710/106; 710/11; 710/14; 710/71; 710/126; 710/129
(58) Field of Search .................................. 710/65–71, 11, 710/14, 105, 106, 126–129

(56) References Cited

U.S. PATENT DOCUMENTS

| | | | |
|---|---|---|---|
| 4,463,421 | * 7/1984 | Laws | 710/46 |
| 4,680,754 | * 7/1987 | Fechalos | 370/468 |
| 4,799,216 | * 1/1989 | Johnson et al. | 370/364 |
| 5,742,531 | * 4/1998 | Freidin et al. | 708/232 |
| 6,021,450 | * 2/2000 | Yoshizawa et al. | 710/128 |

FOREIGN PATENT DOCUMENTS 7-235952    9/1995 (JP) .

* cited by examiner

*Primary Examiner*—Sumati Lefkowitz
(74) *Attorney, Agent, or Firm*—Eric J. Robinson; Nixon Peabody LLP

(57) ABSTRACT

If a normal transmission mode has been specified, then four drivers included in a transmitter unit are activated by the respective outputs of four logical elements such that parallel signal transmission is performed using all of four signal lines each including a terminal resistor. Alternatively, if a limited transmission mode has been specified, then only one particular driver out of the four drivers is activated by the output of a parallel/serial converter such that serial signal transmission is performed using only one particular signal line out of the four signal lines. And the output impedances of three non-used drivers are increased by the outputs of three logical elements, thereby blocking direct current resulting from the terminal resistance of the respective non-used signal lines.

10 Claims, 11 Drawing Sheets

Fig. 3

LOGIC 0, 1, 2

| M | S | P | U | L |
|---|---|---|---|---|
| 0 | 0 | - | 0 | 0 |
| 0 | 1 | - | 1 | 1 |
| 1 | 0 | 0 | 1 | 0 |
| 1 | 1 | 1 | 1 | 0 |

Fig. 4

LOGIC 3

| M | S | P | U | L |
|---|---|---|---|---|
| 0 | 0 | - | 0 | 0 |
| 0 | 1 | - | 1 | 1 |
| 1 | 0 | 0 | Hi-Z | Hi-Z |
| 1 | 1 | 1 | Hi-Z | Hi-Z |

Fig. 6

LOGIC 10, 11, 12, 13

| M | A | P | Q |
|---|---|---|---|
| 0 | 0 | x | 0 |
| 0 | 1 | x | 1 |
| 1 | x | 0 | 0 |
| 1 | x | 1 | 1 | x: Don't Care

Fig. 8

LOGIC 0, 1, 2, 3

| M | S | U | L |
|---|---|---|---|
| 0 | 0 | 0 | 0 |
| 0 | 1 | 1 | 1 |
| 1 | 0 | 1 | 0 |
| 1 | 1 | 1 | 0 |

Fig. 11

LOGIC 0, 1, 2

| M | N | S | P | U | L |
|---|---|---|---|---|---|
| 0 | x | 0 | - | 0 | 0 |
| 0 | x | 1 | - | 1 | 1 |
| 1 | 0 | 0 | 0 | 1 | 0 |
| 1 | 0 | 1 | 1 | 1 | 0 |
| 1 | 1 | x | - | 1 | 0 | x:Don't Care

Fig. 12

LOGIC 3

| M | N | S | P | U | L |
|---|---|---|---|---|---|
| 0 | x | 0 | - | 0 | 0 |
| 0 | x | 1 | - | 1 | 1 |
| 1 | 0 | 0 | 0 | Hi-Z | Hi-Z |
| 1 | 0 | 1 | 1 | Hi-Z | Hi-Z |
| 1 | 1 | x | - | 1 | 0 | x:Don't Care

Fig. 14

LOGIC 10, 11, 12, 13

| M | N | A | P | Q |
|---|---|---|---|---|
| 0 | x | 0 | x | 0 |
| 0 | x | 1 | x | 1 |
| 1 | 0 | x | 0 | 0 |
| 1 | 0 | x | 1 | 1 |
| 1 | 1 | x | x | - | x:Don't Care

SIGNAL TRANSMISSION SYSTEM HAVING MULTIPLE TRANSMISSION MODES

BACKGROUND OF THE INVENTION

The present invention relates to an improved parallel signal transmission system operating with reduced power consumption.

A signal transmission system, including a transmitter unit, a receiver unit and a plurality of signal lines interposed between these units, is well known in the art. The total number of signal lines is prescribed based on the maximum amount of information to be transmitted. The transmitter unit includes a plurality of drivers each connected to associated one of the signal lines. For example, each of these drivers includes: a PMOS transistor interposed between a power line (voltage VDD) and an associated signal line; and an NMOS transistor interposed between the associated signal line and a ground line (voltage VSS).

High-speed signal transmission among a plurality of semiconductor integrated circuit chips mounted on a single printed wiring board is now in high demand. For example, in processing an enormous amount of moving picture data, a parallel signal transmission technique is employed to transmit address signals, data signals and other control signals between a memory controller and a memory. The higher the speed of signal transmission of this type is, the more noticeably a signal waveform is affected by reflection resulting from the inductance of a signal line. Thus, each of the signal lines used for parallel signal transmission is connected to a terminal voltage line (voltage VTT) via a low-impedance terminal resistor. The terminal voltage VTT is set approximately at (VDD+VSS)/2, for example.

Assume each of the signal lines used for parallel signal transmission among semiconductor integrated circuit chips is connected to a terminal resistor. Then, if the output of a driver is logic "1" (i.e., if the PMOS transistor in the driver is ON), direct current flows from the power line (voltage VDD) through the PMOS transistor and the associated signal line and terminal resistor into the terminal voltage line (voltage VTT). Conversely, if the output of a driver is logic "0" (i.e., if the NMOS transistor in the driver is ON), then direct current flows from the terminal voltage line (voltage VTT) through the associated terminal resistor and signal line and the NMOS transistor into the ground line (voltage VSS). All of these drivers and terminal resistors always generate these direct currents. Accordingly, the power consumed due to the generation of direct current is non-negligibly high.

In performing parallel signal transmission among circuit blocks in a single semiconductor integrated circuit chip, a signal line is not connected to a terminal resistor unlike chip-to-chip parallel transmission. Instead, direct current resulting from charging/discharging of parasitic capacitance associated with each signal line is always generated in every driver. Accordingly, the power consumed due to the generation of direct current is also non-negligibly high.

SUMMARY OF THE INVENTION

The object of the present invention is reducing the power consumed by such a parallel signal transmission system.

In a parallel signal transmission system in general, the amount of information to be transmitted per unit time is variable from moment to moment. A state where there is no information to be transmitted at all, e.g., a standby state, also exists. Moreover, in transmitting a multi-bit address signal, for example, a higher-order address signal is less variable than a lower-order address signal. In other words, a higher-order address signal can transmit a smaller amount of information per unit time than a lower-order address signal. The present invention was conceived by taking special note of these points. That is to say, according to the present invention, if the amount of information to be transmitted per unit time is relatively small, signal transmission is carried out using only one or some of the signal lines provided.

Specifically, according to the present invention, a signal line or lines to be used are selected on a mode-by-mode basis from a plurality of signal lines provided. For example, if a normal transmission mode has been specified, then parallel signal transmission is performed using all of these signal lines. Alternatively, if a limited transmission mode has been specified, then signal transmission is carried out without using at least one of the signal lines. In addition, in the limited transmission mode, the impedance between the non-used signal line and a direct current power supply is increased in such a manner as to reduce the current flowing through the non-used signal line. Furthermore, if a transmission stop mode has been specified, the impedances between the respective signal lines and the direct current power supply are all increased such that none of these signal lines are used for signal transmission and that the currents flowing through these signal lines are all reduced. In order to increase the impedance between a signal line and the direct current power supply, the output impedance of a driver implemented as a CMOS inverter may be increased by turning OFF PMOS and NMOS transistors in the driver.

More specifically, the signal transmission system according to the present invention includes: a transmitter unit; a receiver unit; and a plurality of signal lines interposed between these units. The transmitter unit includes: a plurality of drivers each connected to associated one of the signal lines; and logic means. If a normal transmission mode has been specified, then the logic means activates all of these drivers such that parallel signal transmission is performed using all of these signal lines. On the other hand, if a limited transmission mode has been specified, the logic means activates used one or ones of the drivers and increases the output impedance of non-used one of drivers such that signal transmission is performed without using at least one of the signal lines. In the limited transmission mode, the non-used driver having high output impedance reduces the direct current flowing through the associated non-used signal line. The receiver unit also includes logic means correspondingly. If the normal transmission mode has been specified, then the logic means of the receiver unit validates all signals received from the signal lines. Conversely, if the limited transmission mode has been specified, then the logic means of the receiver unit validates a signal or signals received from used one or ones of the signal lines and invalidates a signal received from the non-used one of the signal lines. According to the present invention, a transmission stop mode may be employed in addition to the normal transmission and limited transmission modes. In the transmission stop mode, the logic means of the transmitter unit increases all the output impedances of the respective drivers, while the logic means of the receiver unit invalidates all the signals received from the signal lines.

In order to perform signal transmission using a reduced number of signal lines in the limited transmission mode as in the normal transmission mode, parallel/serial converter and serial/parallel converter are provided as the logic means of the transmitter and receiver units, respectively.

BRIEF DESCRIPTION OF THE DRAWINGS

FIG. 3 is a truth table of Logic 0 through 2 shown in FIG. 2.

FIG. 4 is a truth table of Logic 3 shown in FIG. 2.

FIG. 6 is a truth table of Logic 10 through 13 shown in FIG. 5.

FIG. 8 is a truth table of Logic 0 through 3 shown in FIG. 7.

FIG. 11 is a truth table of Logic 0 through 2 shown in FIG. 10.

FIG. 12 is a truth table of Logic 3 shown in FIG. 10.

FIG. 14 is a truth table of Logic 10 through 13 shown in FIG. 13.

DETAILED DESCRIPTION OF THE INVENTION

Hereinafter, an exemplary application of the present invention to the parallel transmission of address signals, data signals and other control signals from a memory controller to memories will be described with reference to the accompanying drawings. In the following example, the memory controller. is exemplified as a transmitter unit and the memories are exemplified as receiver units. For the sake of simplicity, the number of signal lines interposed between the memory controller and the memories is assumed to be four. It should be noted, however, that the present invention is naturally applicable to parallel signal transmission from the memories to the memory controller.

Figure 1:
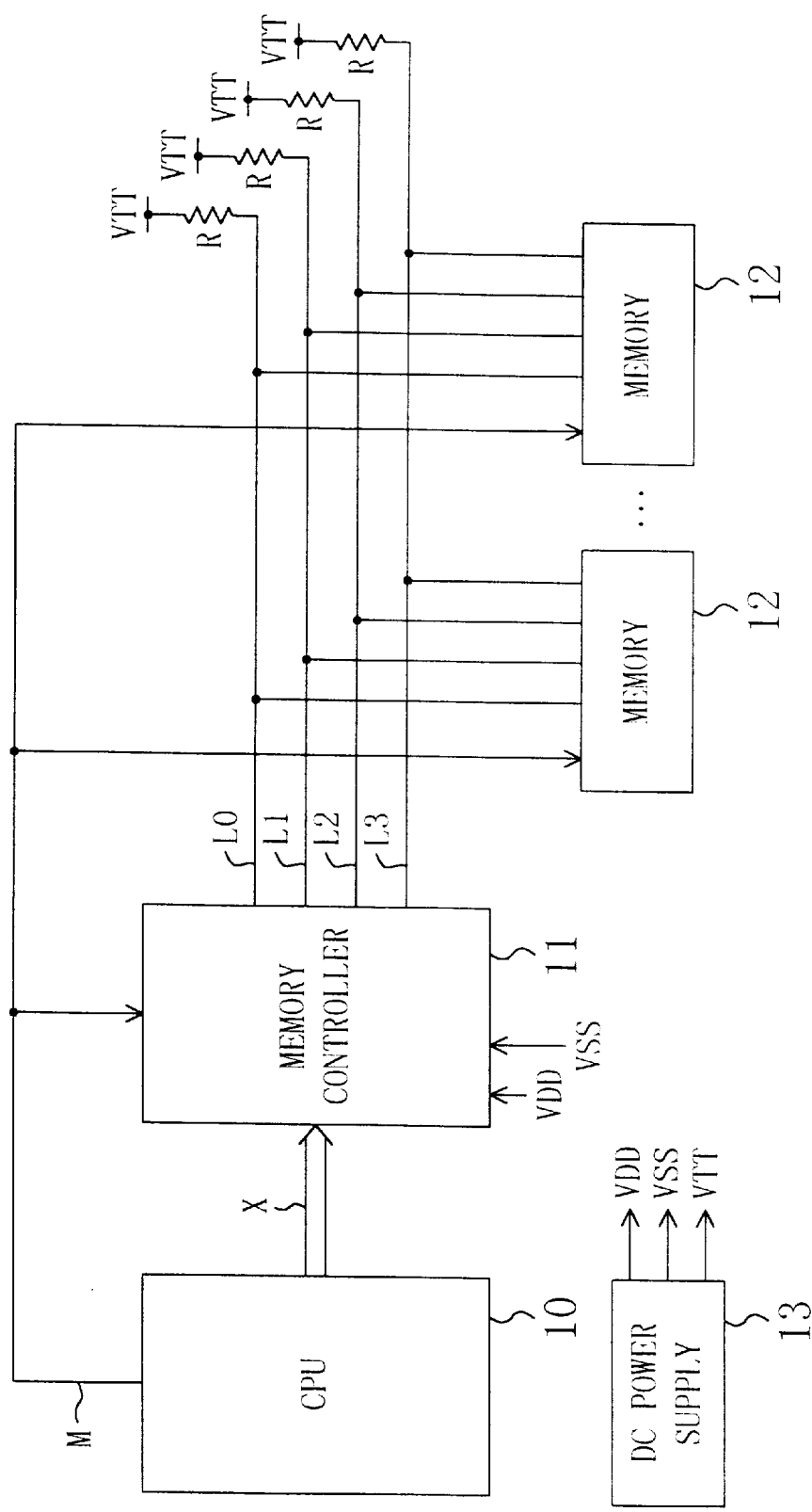
FIG. 1 is a block diagram illustrating an exemplary configuration of a computer including the signal transmission system of the present invention.

FIG. 1 illustrates an exemplary configuration of a computer including the signal transmission system of the present invention. The computer shown in FIG. 1 includes a plurality of semiconductor integrated circuit chips mounted on a single printed wiring board. Specifically, the computer includes: a central processing unit (CPU) 10; a memory controller 11; a plurality of memories 12; and a direct current (DC) power supply 13. Four signal lines L0, L1, L2 and L3 are interposed between the memory controller 11 and the memories 12. Each of these four signal lines L0 through L3 is connected to a terminal voltage line (voltage VTT) via a terminal resistor R such that the reflection of a signal transmitted therethrough is suppressed. The CPU 10 supplies a signal X (address signal, data signal or any other control signal) to the memory controller 11 and a mode signal M representing a signal transmission mode specified to the memory controller 11 and the respective memories 12. If M=0, a normal transmission mode is selected. To the contrary, if M=1, a limited transmission mode is selected. The DC power supply 13 supplies voltages VDD, VSS and VTT to a power line, a ground line and a terminal voltage line, respectively. The terminal voltage VTT is set approximately at (VDD +VSS)/2, for example. It should be noted that the illustration of the voltages VTT and VSS to the respective circuit blocks 10 and 12 except for the memory controller 11 is omitted in FIG. 1.

Figure 2:
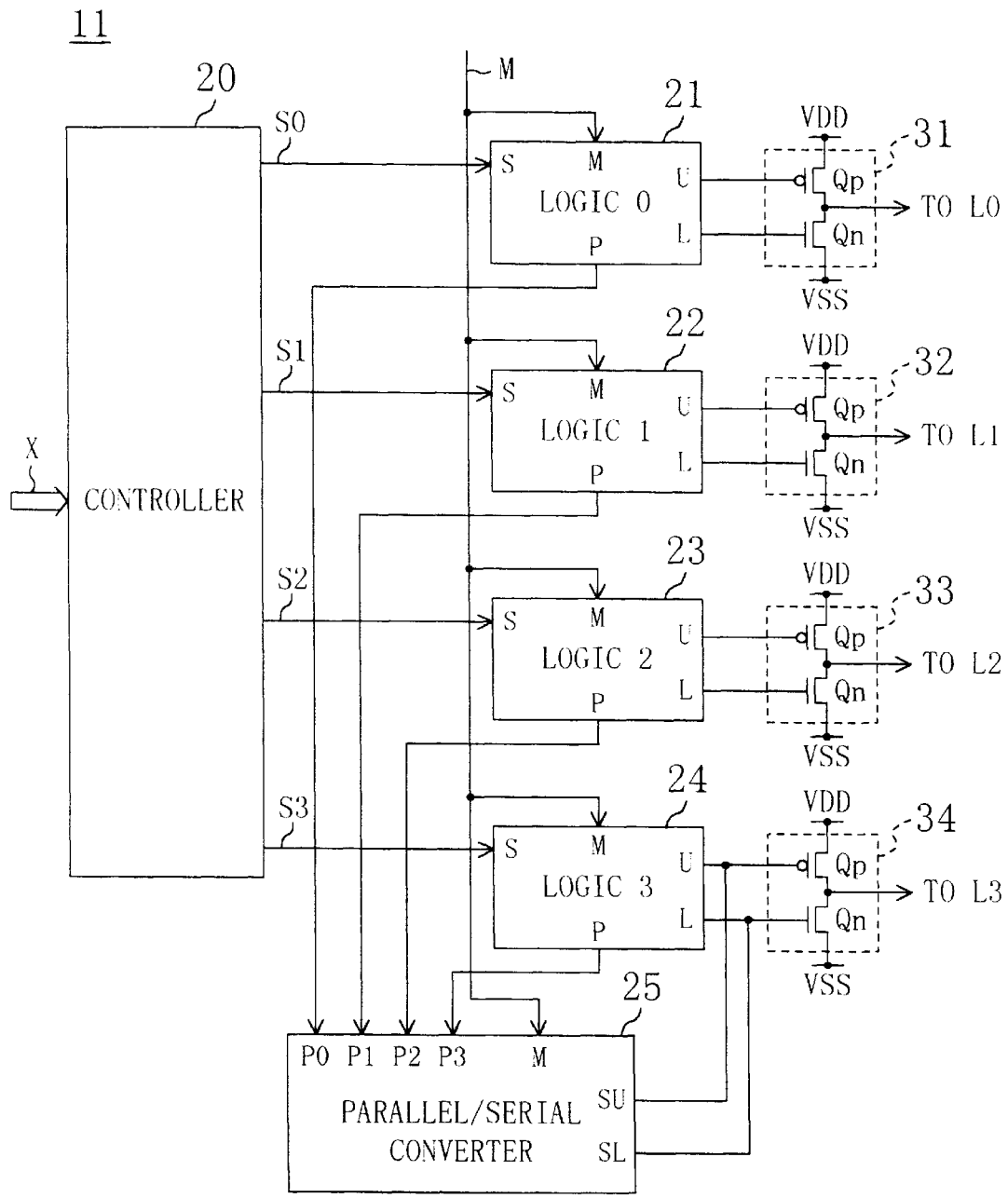
FIG. 2 is a block diagram illustrating an internal configuration of the memory controller shown in FIG. 1.

FIG. 2 illustrates an internal configuration of the memory controller shown in FIG. 1. As shown in FIG. 2, the memory controller 11 includes: a controller 20; four logical elements (Logic 0, 1, 2 and 3) 21, 22, 23 and 24; a parallel/serial converter 25; and four drivers 31, 32, 33 and 34. If the normal transmission mode (M=0) has been specified, then the four drivers 31 through 34 are all activated such that parallel signal transmission is performed using all of the four signal lines L0 through L3. Alternatively, if the limited transmission mode (M=1) has been specified, then a particular driver (e.g., 34) is activated by the output of the parallel/serial converter 25 and the output impedances of the non-used drivers 31, 32 and 33 are increased such that serial signal transmission is carried out using only one particular signal line L3 out of the four signal lines L0 through L3.

The driver 31 is implemented as a CMOS inverter including a PMOS transistor Qp interposed between the power line (voltage VDD) and the signal line L0 and an NMOS transistor Qn interposed between the signal line L0 and the ground line (voltage VSS). The driver 32 includes a PMOS transistor Qp interposed between the power line and the signal line L1 and an NMOS transistor Qn interposed between the signal line L1 and the ground line. The driver 33 includes a PMOS transistor Qp interposed between the power line and the signal line L2 and an NMOS transistor Qn interposed between the signal line L2 and the ground line. And the driver 34 includes a PMOS transistor Qp interposed between the power line and the signal line L3 and an NMOS transistor Qn interposed between the signal line L3 and the ground line.

The controller 20 generates signals to be transmitted S0, S1, S2 and S3 from the signals X supplied from the CPU 10.

If M=1 (limited transmission mode), the parallel/serial converter 25 converts parallel signals P3, P2, P1 and P0 supplied into serial signals SU and SL (=P3, P2, P1 and P0) in this order, and then supplies the serial signals SU and SL obtained by this conversion to the driver 34. Conversely, if M=0 (normal transmission mode), the parallel/serial converter 25 performs no conversion and increases the output impedance thereof associated with the serial signals SU and SL.

FIG. 3 is a truth table of Logic 0 through 2 in FIG. 2, and FIG. 4 is a truth table of Logic 3 shown in FIG. 2. Hereinafter, the normal transmission mode (M=0) and the limited transmission mode (M=1) will be individually described with reference to FIGS. 3 and 4.

First, the normal transmission mode (M=0) will be described. As shown in FIGS. 3 and 4, if M=0, then Logic 0 supplies signals U (=S0) and L (=S0) to the respective gates of the PMOS and NMOS transistors Qp and Qn in the driver 31 in response to the signal S0. Logic 1 supplies signals U (=S1) and L (=S1) to the respective gates of the PMOS and NMOS transistors Qp and Qn in the driver 32 in response to the signal S1. Logic 2 supplies signals U (=S2) and L (=S2) to the respective gates of the PMOS and NMOS transistors Qp and Qn in the driver 33 in response to the signal S2. And Logic 3 supplies signals U (=S3) and L (=S3) to the respective gates of the PMOS and NMOS transistors Qp and Qn in the driver 34 in response to the signal S3. That is to say, where the normal transmission mode (M=0) has been specified, if S0=0, then the PMOS transistor Qp in the driver 31 is activated and turned ON. Conversely, if S0=1, then the NMOS transistor Qn in the driver 31 is activated and turned ON. If S1=0, then the PMOS transistor Qp in the driver 32 is activated and turned ON. Alternatively, if S1=1, then the NMOS transistor Qn in the driver 32 is activated and turned ON. If S2=0, then the PMOS transistor Qp in the driver 33 is activated and turned ON. To the contrary, if S2=1, then the NMOS transistor Qn in the driver 33 is activated and turned ON. And if S3=0, then the PMOS transistor Qp in the driver 34 is activated and turned ON. Alternatively, if S3=1, then the NMOS transistor Qn in the driver 34 is activated and turned ON. As a result, parallel transmission of the signals S0 through S3 is performed using all of the four signal lines L1 through L3. In the meantime, the parallel/serial converter 25 increases the output impedance thereof associated with the serial signals SU and SL.

Next, the limited transmission mode (M=1) will be described. As shown in FIGS. 3 and 4, if M=1, then Logic 0 supplies constant signals U (=1) and L (=0) to the respective gates of the PMOS and NMOS transistors Qp and Qn in the driver 31 irrespective of the level of the signal S0. Logic 1 supplies constant signals U (=1) and L (=0) to the respective gates of the PMOS and NMOS transistors Qp and Qn in the driver 32 irrespective of the level of the signal S1. Logic 2 supplies constant signals U (=1) and L (=0) to the respective gates of the PMOS and NMOS transistors Qp and Qn in the driver 33 irrespective of the level of the signal S2. And Logic 3 increases the output impedances associated with the signals U and.L thereof irrespective of the level of the signal S3. Logic 0, 1, 2 and 3 respectively supply signals P0 (=S0), P1 (=S1), P2 (=S2) and P3 (=S3) in parallel to the parallel/serial converter 25 in response to the signals S0, S1, S2 and S3, respectively. The parallel/serial converter 25 converts these parallel signals P3, P2, P1 and P0 supplied into the serial signals SU and SL (=P3, P2, P1 and P0) in this order, and then supplies the serial signals SU and SL obtained by this conversion to the respective gates of the PMOS and NMOS transistors Qp and Qn in the driver 34. That is to say, if the limited transmission mode (M=1) has been specified, then the respective output impedances of the three drivers 31, 32 and 33 are increased so as not to use the three signal lines L0, L1 and L2 associated with these drivers, while only one driver 34 is activated in response to the output of the parallel/serial converter 25. In this case, the parallel/serial converter 25 activates the PMOS and NMOS transistors in the driver 34 in place of Logic 3. As a result, serial signal transmission is performed using only one signal line L3 out of the four signal lines L0 through and L3.

In this manner, while the memory controller (transmitter unit) 11 shown in FIG. 2 operates in the limited transmission mode (M=1), the respective numbers of drivers used and signal lines used are limited to "1" and the direct current in the non-used signal lines L0, L1 and L2 are blocked by the non-used drivers 31, 32 and 33 having high output impedances in the mode. Accordingly, the direct currents flowing through these three non-used signal lines L0, L1 and L2 and the associated three terminal resistors R are all reduced to zero. Consequently, compared with the normal transmission mode (M=0), the power consumption resulting from the direct current flowing through the signal lines can be cut down to one-fourth.

Figure 5:
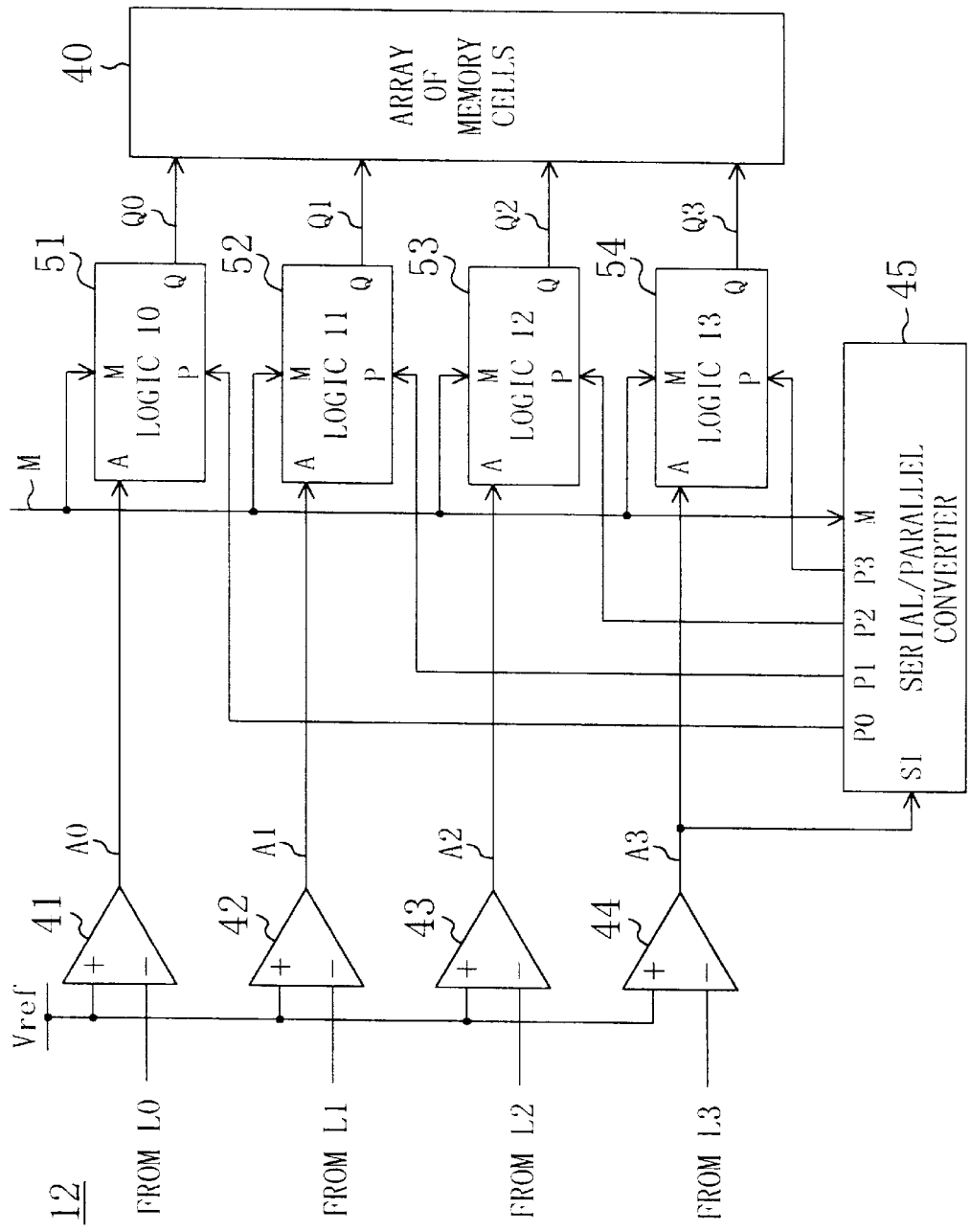
FIG. 5 is a block diagram illustrating an internal configuration of the memory shown in FIG. 1.

FIG. 5 illustrates an internal configuration of the memory 12 shown in FIG. 1 in association with the configuration shown in FIG. 2. As shown in FIG. 5, the memory 12 includes: an array 40 of memory cells; four receivers 41, 42, 43 and 44; a serial/parallel converter 45; and four logical elements (Logic 10, 11, 12 and 13) 51, 52, 53 and 54. If the normal transmission mode (M=0) has been specified, the signals received through the four signal lines L0 through L3 are all validated. Alternatively, if the limited transmission mode (M=1) has been specified, then only the signal received through one particular signal line L3 out of the four signal lines L0 through L3 is validated.

In FIG. 5, a reference voltage Vref, set equal to the terminal voltage VTT, for example, is applied to all of the four receivers 41 through 44. The receiver 41 is a differential amplifier receiving a voltage on the signal line L0 and the reference voltage Vref as respective inputs. The receiver 42 is a differential amplifier receiving a voltage on the signal line L1i and the reference voltage vref as respective inputs. The receiver 43 is a differential amplifier receiving a voltage on the signal line L2 and the reference voltage Vref as respective inputs. And the receiver 44 is a differential amplifier receiving a voltage on the signal line L3 and the reference voltage Vref as respective inputs.

If M=1 (limited transmission mode), then the serial/parallel converter 45 converts a serial signal A3, which has been received through the receiver 44, into parallel signals P3, P2, P1 and P0. Alternatively, if M=0(normal transmission mode), then the serial/parallel converter 45 performs no conversion.

FIG. 6 is a truth table of Logic 10 through 13 shown in FIG. 5. Hereinafter, the normal transmission mode (M=0) and the limited transmission mode (M=1) will be individually described with reference to FIG. 6.

First, the normal transmission mode (M=0) will be described. As shown in FIG. 6, if M=0, then Logic 10, 11, 12 and 13 supply respective signals Q0 (=A0), Q1 (=A1), Q2 (=A2) and Q3 (=A3) to the array 40 of memory cells in response to the signals A0, A1, A2 and A3 supplied from the receivers 41, 42, 43 and 44, respectively. That is to say, if the normal transmission mode (M=0) has been specified, then the parallel signals received through the four signal lines L0 through L3 are all validated and then supplied to the array 40.

Next, the limited transmission mode (M=1) will be described. As shown in FIG. 6, if M=1, then Logic 10 through 13 supply respective signals Q0 (=P0), Q1 (=P1), Q2 (=P2) and Q3 (=P3) to the array 40 of memory cells in response to the parallel signals P0, P1, P2 and P3 supplied from the serial/parallel converter 45. That is to say, if the limited transmission mode (M=1) has been specified, then the serial signal received from only one signal line L3 out of the four signal lines L0 through L3 is validated and then respective parallel signals generated therefrom are supplied to the array 40.

As can be understood, the memory (receiver unit) 12 shown in FIG. 5 can perform receiving operations corresponding to the operations of the memory controller (transmitter unit) 11 shown in FIG. 2 in respective transmission modes.

It should be noted that the CPU 10 shown in FIG. 1 specifies the normal transmission mode (M=0) if the amount of information to be transmitted from the memory controller 11 to the memories 12 per unit time is large, and the limited transmission mode (M=1) if the amount of the information is small. Optionally, in the limited transmission mode, only higher-order address signals having smaller transition probabilities, not all the address signals, may be selectively subjected to parallel/serial conversion. Also, the memory controller 11 may generate the mode signal M in place of the CPU 10.

In the foregoing example, the total number of signal lines making up a transmission line is four, only one of which is used in the limited transmission mode. However, the present invention is not limited to such a specific example in any way. For example, 8 out of 64 signal lines may be used in the limited transmission mode.

The foregoing example is applicable to parallel signal transmission among semiconductor integrated circuit chips of any other type, and is also applicable to parallel signal transmission among circuit blocks in a single semiconductor integrated circuit chip. In the latter case, direct current, resulting from charging/discharging of parasitic capacitance associated with non-used signal lines, can be blocked by associated non-used drivers having high output impedances in the limited transmission mode. As a result, the power consumed by the chip can be reduced.

Figure 7:
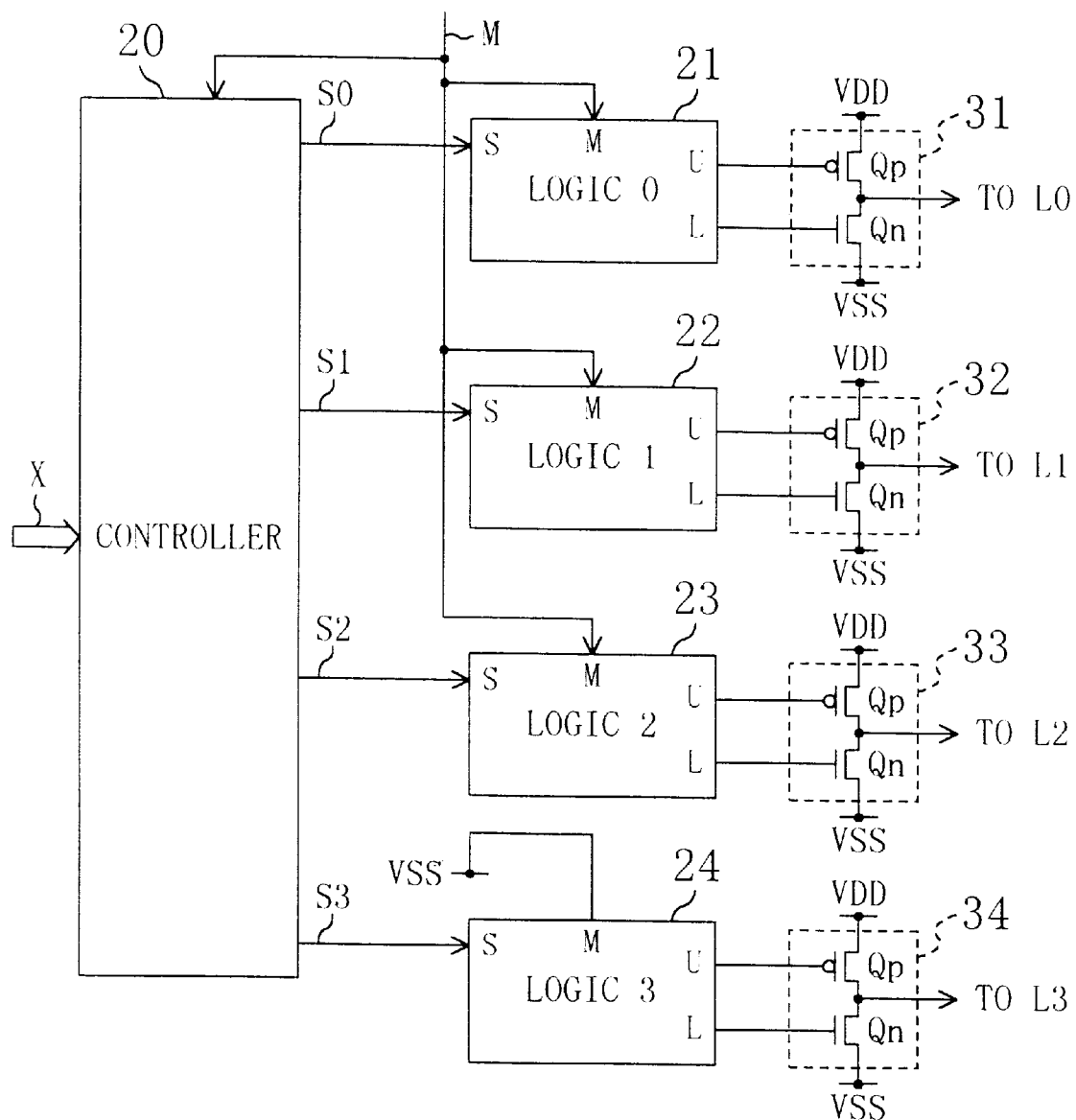
FIG. 7 is a block diagram illustrating a modified example of the configuration shown in FIG. 2.

If the CPU 10 shown in FIG. 1 incorporates a parallel/serial converter, then the parallel/serial converter 25 shown in FIG. 2 may be omitted. FIG. 7 illustrates a modified example of the configuration shown in FIG. 2 in such a case. In the normal transmission mode (M=0), the CPU 10 supplies a parallel signal X to the memory controller 11 shown in FIG. 7. On the other hand, in the limited transmission mode (M=1), the CPU 10 supplies a serial signal X to the memory controller 11 using only one of a plurality of signal lines constituting a transmission line for the signal X. If the normal transmission mode M=0 has been specified, then the controller 20 shown in FIG. 7 generates signals S0, S1, S2 and S3 in response to the parallel signal x supplied from the CPU 10. Alternatively, if the limited transmission mode (M=1) has been specified, then the controller 20 provides the serial signal X, supplied from the CPU 10, as the signal S3 as it is.

FIG. 8 is a truth table of Logic 0 through 3 shown in FIG. 7. It should be noted that the mode signal input of Logic 3 is fixed at logic 0. As shown in FIG. 8, if the normal transmission mode (M=0) has been specified, then parallel transmission of the signals S0 through S3 is performed using all of the four signal lines L0 through L3. Conversely, if the limited transmission mode (M=1) has been specified, then serial signal transmission is performed using only one signal line L3 out of the four signal lines L0 through L3. In this case, the memory 12 may also have the internal configuration shown in FIG. 5. It should be noted that the CPU 10 may specify in the limited transmission mode which of the four signal lines L0 through L3 should be used.

Figure 9:
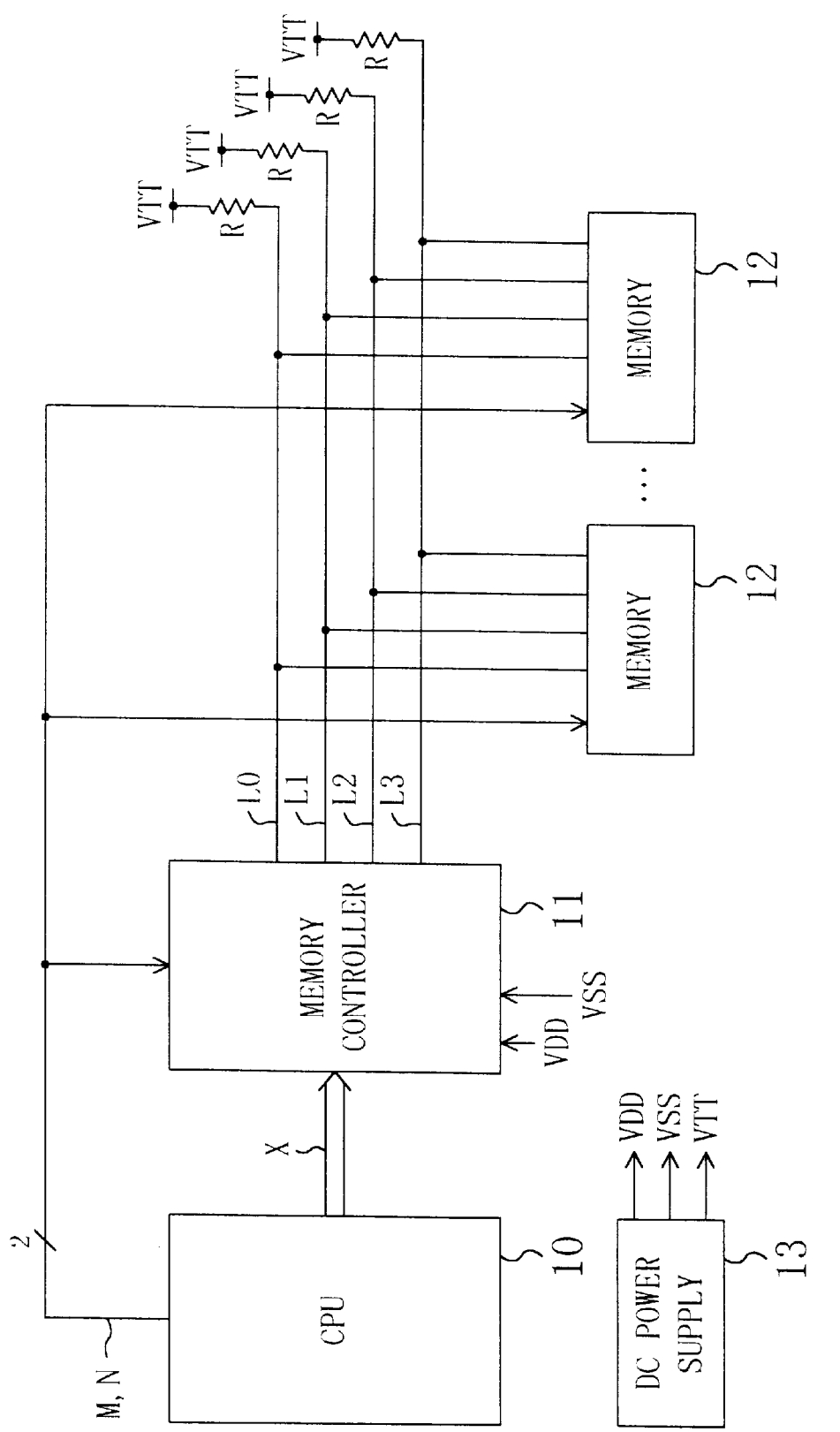
FIG. 9 is a block diagram illustrating a modified example of the configuration shown in FIG. 1.

Considering a standby state exists in a computer, a transmission stop mode may be employed in addition to the normal transmission and limited transmission modes. FIG. 9 illustrates a modified example of the configuration shown in FIG. 1 in such a case. The CPU 10 shown in FIG. 9 supplies two-bit mode signals M and N. representing a specified signal transmission mode together, to the memory controller 11 and the memories 12. If M=0, then the normal transmission mode is selected. If M=1 and N=0, then the limited transmission mode is selected. And if M=1 and N=1, then the transmission stop mode is selected.

Figure 10:
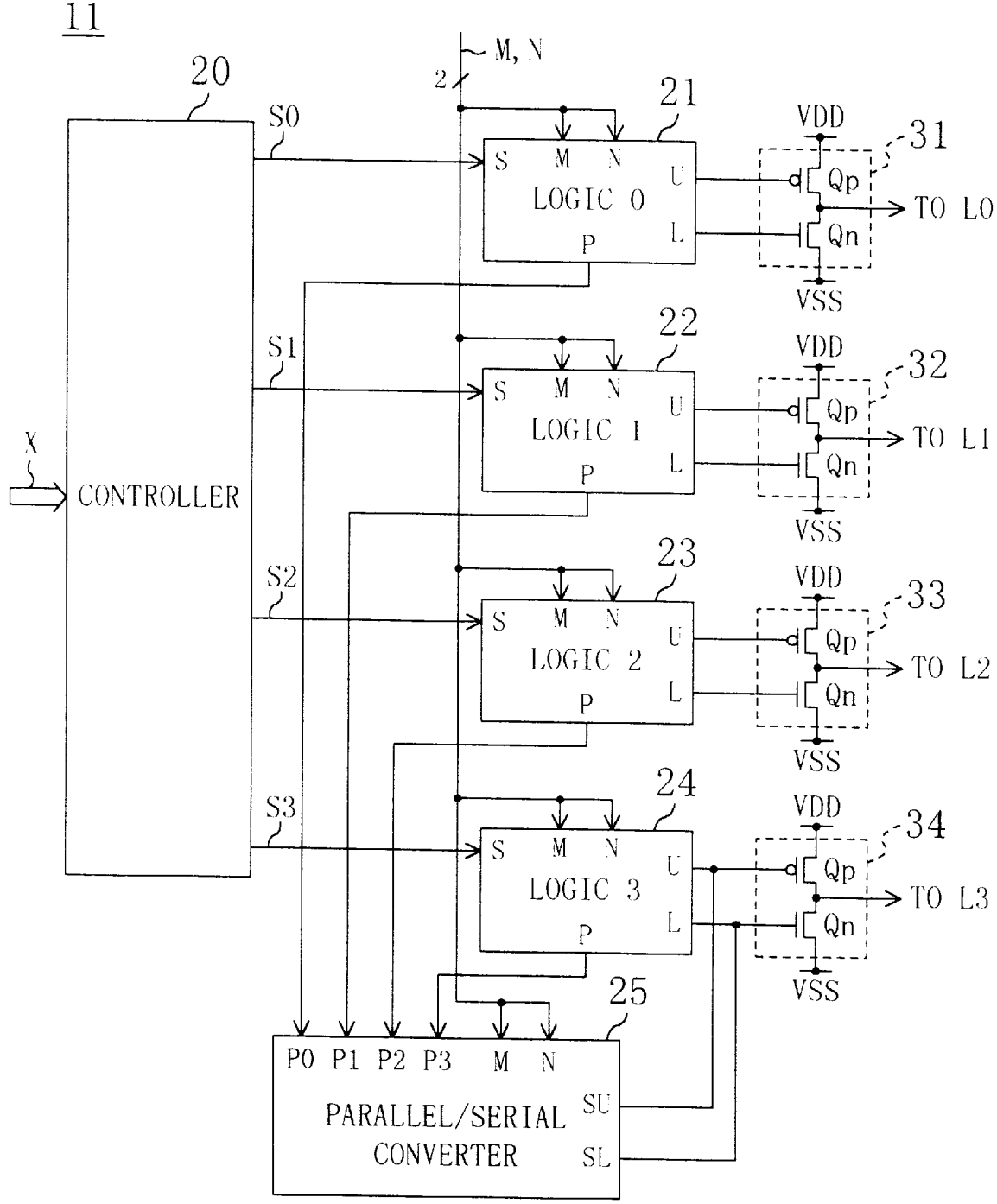
FIG. 10 is a block diagram illustrating an internal configuration of the memory controller shown in FIG. 9.

FIG. 10 illustrates an internal configuration of the memory controller 11 shown in FIG. 9. As shown in FIG. 10, Logic 0 through 3 and the parallel/serial converter 25 each receive the mode signals M and N. The parallel/serial converter 25 shown in FIG. 10 performs a conversion operation if M=1 and N=0 (limited transmission mode), but performs no conversion operation and increases the output impedance thereof if M=0 (normal transmission mode) or if M=1 and N=1 (transmission stop mode).

FIG. 11 is a truth table of Logic 0 through 2 in FIG. 10, while FIG. 12 is a truth table of Logic 3 shown in FIG. 10. As shown in FIGS. 11 and 12, if the transmission stop mode (M=1 and N=1) has been specified, then the output impedances of the four drivers 31, 32, 33 and 34 are increased so as not to use any of the four signal lines L0, L1, L2 and L3.

Figure 13:
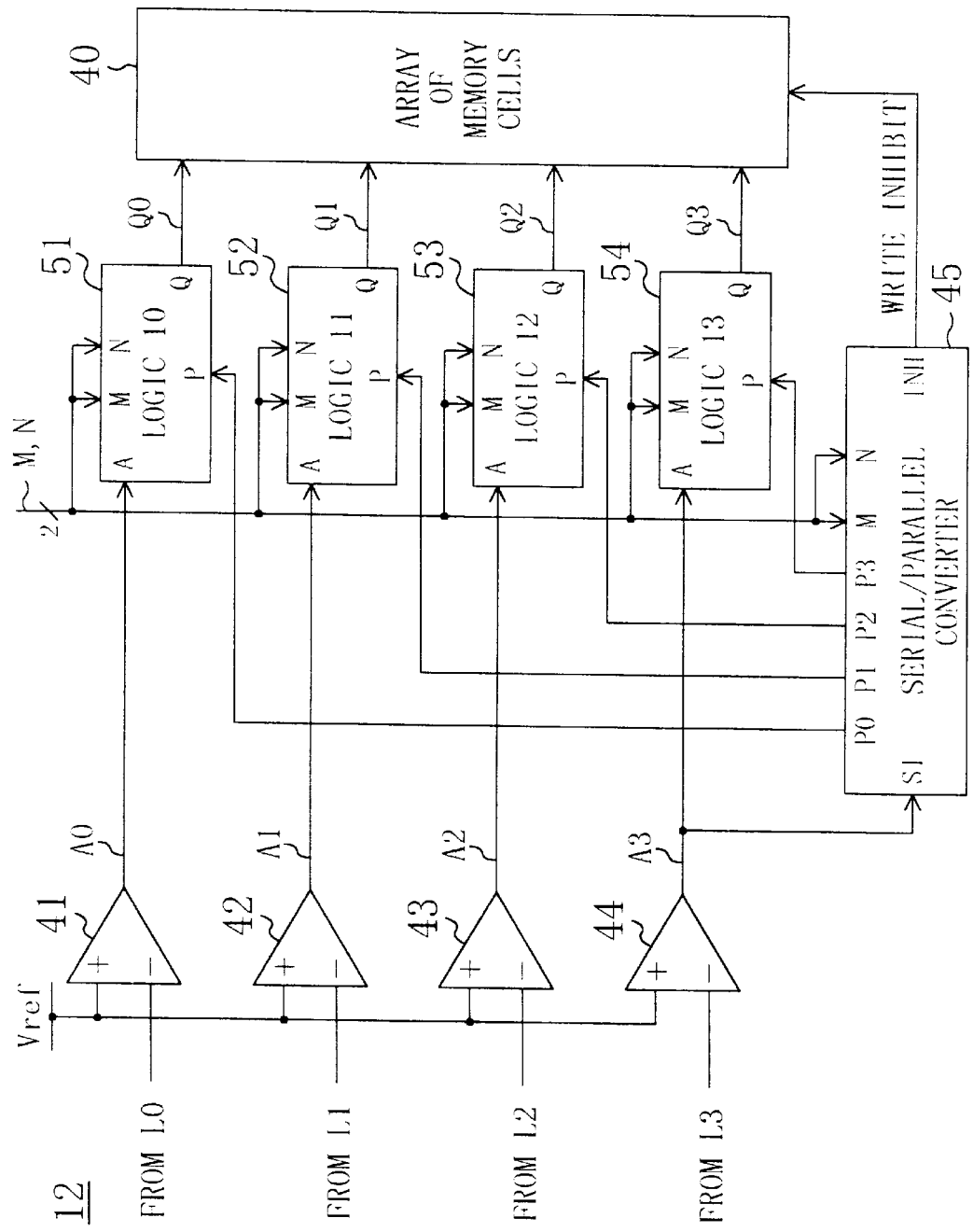
FIG. 13 is a block diagram illustrating an internal configuration of the memory shown in FIG. 9.

FIG. 13 illustrates an internal configuration of the memory 12 shown in FIG. 9 in association with the configuration shown in FIG. 10. As shown in FIG. 13, the serial/parallel converter 45 and Logic 10 through 13 each receive the mode signals M and N. The serial/parallel converter 45 shown in FIG. 13 performs a conversion operation if M=1 and N=0 (limited transmission mode), but performs no conversion operation if M=0 (normal transmission mode) or if M=1 and N=1 (transmission stop mode). Also, if M=1 and N=1 (transmission stop mode), the serial/parallel converter 45 supplies a write inhibiting signal INH to the array 40 of memory cells.

FIG. 14 is a truth table of Logic 10 through 13 shown in FIG. 13. In the transmission stop mode (M=1 and N=1), the array 40 of memory cells refuses to receive the signals Q0, Q1, Q2 and Q3 supplied from Logic 10 through 13 in response to the write inhibiting signal INH received from the serial/parallel converter 45. In other words, the signals received from the four signal lines L0 through L3 are all invalidated in the transmission stop mode.

If the CPU 10 shown in FIG. 9 incorporates a parallel/serial converter, then the parallel/serial converter shown in FIG. 10 may be omitted. If the amount of information to be transmitted from the memory controller 11 to the memories 12 per unit time is extremely small, the limited transmission mode (M=1 and N=0) and the transmission stop mode (M=1 and N=1) may be alternately selected at regular intervals. In such a case, serial signal transmission using only one signal line L3 out of the four signal lines L0 through L3 is performed intermittently.

In the foregoing examples, if the signal line L0 is not used, for instance, then the PMOS and NMOS transistors in the driver 31 are both turned OFF to increase the output impedance of the driver 31 for the signal line L0 and thereby increase the impedance between the signal line L0 and the DC power supply 13. As a result, a current path running from the DC power supply 13 through the power line (voltage VDD), the PMOS transistor Qp, the signal line L0, the terminal resistor R and the terminal voltage line (voltage VTT) back into the DC power supply 13 is blocked. In addition, a current path running from the DC power supply 13 through the terminal voltage line (voltage VTT), the terminal resistor R, the signal line L0, the NMOS transistor Qn and the ground line (voltage VSS) back into the DC power supply 13 is also blocked. However, considering that these current paths both include the terminal resistor R, by increasing the terminal resistance R, the impedance between the signal line L0 and the DC power supply 13 can be increased and therefore the direct current flowing through the non-used signal line L0 can be blocked or reduced. Also, the internal impedance of the DC power supply 13 may be changed with respect to the terminal voltage VTT.

What is claimed is:

1. A signal transmission system comprising: a transmitter unit; a receiver unit; a plurality of signal lines interposed between the transmitter and receiver units; and a direct current power supply, wherein the system further comprises:

means for selecting used one or ones from the signal lines such that parallel signal transmission is performed using all of the signal lines if a normal transmission mode has been specified, and that signal transmission is carried out without using at least one of the signal lines if a limited transmission mode has been specified; and means for increasing an impedance between the non-used one of the signal lines and the direct current power supply such that a current flowing through the non-used signal line is reduced in the limited transmission mode.

2. The system of claim 1, further comprising means for increasing impedances between all of the signal lines and the direct current power supply such that none of the signal lines are used for signal transmission between the transmitter and receiver units and that currents flowing through the respective signal lines are all reduced if a transmission stop mode has been specified.

3. A signal transmission system comprising: a transmitter unit; a receiver unit; and a plurality of signal lines interposed between the transmitter and receiver units, wherein the transmitter unit comprises:
a plurality of drivers, each said driver being connected to associated one of the signal lines; and
logic means for activating all of the drivers such that parallel signal transmission is performed using all of the signal lines if a normal transmission mode has been specified, and for activating used one or ones of the drivers and increasing the output impedance of non-used one of the drivers such that signal is transmitted without using at least one of the signal lines if a limited transmission mode has been specified, and wherein the receiver unit comprises
logic means for validating all of signals received through the signal lines if the normal transmission mode has been specified, and for validating a signal or signals received through used one or ones of the signal lines and invalidating a signal received through non-used one of the signal lines if the limited transmission mode has been specified.

4. The system of claim 3, wherein the logic means of the transmitter unit comprises a parallel/serial converter for supplying a serial signal to the used one of the drivers if the limited transmission mode has been specified.

5. The system of claim 4, wherein the logic means of the receiver unit comprises a serial/parallel converter for converting a received signal into parallel signals if the limited transmission mode has been specified.

6. The system of claim 3, wherein the logic means of the transmitter unit further comprises a function of increasing the output impedances of all of the drivers if a transmission stop mode has been specified.

7. The system of claim 6, wherein the logic means of the receiver unit further comprises a function of invalidating all of the signals received through the signal lines if the transmission stop mode has been specified.

8. The system of claim 3, wherein each said driver comprises:
a PMOS transistor interposed between a power line and associated one of the signal lines; and
an NMOS transistor interposed between the associated signal line and a ground line.

9. The system of claim 3, further comprising a plurality of terminal resistors, each said terminal resistor connecting associated one of the signal lines to a terminal voltage line.

10. The system of claim 3, wherein the transmitter unit is a memory controller and the receiver unit is a memory.

* * * * *